United States Patent
Anderson

[15] 3,662,455
[45] May 16, 1972

[54] METHOD FOR PREPARING AN ANTI-OXIDIZING, ACTIVE ALLOY BRAZING COMPOSITION

[72] Inventor: Glenn A. Anderson, Nashua, N.H.
[73] Assignee: Sanders Associates, Inc., Nashua, N.H.
[22] Filed: Dec. 10, 1970
[21] Appl. No.: 97,019

[52] U.S. Cl..............................29/473.1, 29/504, 75/134 F, 75/134 N, 75/135
[51] Int. Cl........................................................B23k 31/02
[58] Field of Search ................75/134 F, 134 N, 134 R, 135; 29/473.1, 504

[56] References Cited

UNITED STATES PATENTS 2,859,512  10/1958  Dijksterhuis..........................29/473.1
3,594,895  7/1971  Hill......................................29/473.1

Primary Examiner—L. Dewayne Rutledge
Assistant Examiner—J. E. Legru
Attorney—Louis Etlinger

EXEMPLARY CLAIM

There is herein disclosed a nickel-titanium-niobium alloy for effecting improved high temperature metal-to-ceramic and ceramic-to-ceramic braze bonds which are resistant to hot alkali metal vapor and which also provide an oxidation resistant coating.

16 Claims, No Drawings

METHOD FOR PREPARING AN ANTI-OXIDIZING, ACTIVE ALLOY BRAZING COMPOSITION

BACKGROUND OF THE INVENTION

1. Field of the Invention

The present invention relates most generally to the field of brazing alloys and more particularly to a new and improved metal-to-ceramic brazing alloy having oxidation resistance coating properties.

2. Description of the Prior Art

Prior to the present invention a continuing problem has existed in effecting a leak-tight bond between metals and ceramics as well as between ceramics. This problem has been particularly acute in the manufacture of alkali metal vapor arc lamps where oxidation of the metal seals at high temperatures compounds the bonding requirements. The nickel-titanium brazing materials known in the art have generally proven unsatisfactory in their application to arc lamp manufacture in that their quality is quite sensitive to the temperature and the time the lamp is maintained at brazing temperature. These materials further do not permit the melting of the brazed bond and rebrazing without the development of leaks. Substantially no benefit is provided by these materials as to the problem of high temperature seal oxidation when the lamps are operated in an unprotected environment such as air.

OBJECTS AND SUMMARY OF THE INVENTION

From the foregoing it will be understood that among the various objectives of the present invention are:

To provide a new and novel high temperature brazing composition for high purity alumina ceramic materials;

To provide a composition of the above-described character which is inert with respect to hot alkali metal vapors;

To provide a composition of the above-described character for effecting a substantially leak-tight bond between metal and high purity alumina ceramic;

To provide a composition of the above-described character which further reduces high temperature oxidation of metal;

To provide a composition of the above-described character which is relatively insensitive to temperature cycling;

To provide a composition of the above-described character which wets alumina.

These and other objectives of the present invention are efficiently attained by providing a brazing alloy comprising nickel, titanium and niobium in selected proportions. The alloy components are heated together in an inert atmosphere to form the brazing alloy.

The foregoing as well as other objects, features and advantages of the invention will become more apparent from the following description.

DESCRIPTION OF THE PREFERRED EMBODIMENTS

It has been found by the applicant that a superior metal-to-ceramic and ceramic-to-ceramic brazed bond may be effected through the use of a composition of nickel, titanium and niobium. The composition is formed of a mixture of 45 percent by weight titanium in the form of titanium hydride and 55 percent by weight nickel to which is added niobium in an amount of 23 to 110 percent by weight of the titanium-nickel mixture. The overall relative proportion of the brazing alloy constituents thus lie within the following percentage weight ranges:

| Ti | 22.8 – 36.4% |
| Ni | 26.9 – 42.9% |
| Nb | 20.7 – 50.3% |

The three element braze mixture is heated to between 1,190°–1,220° Centigrade in either a vacuum or an inert atmosphere. The mixture is held at the elevated temperature for 0–2 minutes and allowed to cool. It has been established by the Applicant that the quality of the finished brazing alloy is relatively insensitive to both the temperature and time at temperature within the ranges given. In the manufacture of arc lamps a brazing alloy prepared in accordance with the foregoing description provides a helium leak-tight bond between a ceramic lamp envelope and the metallic end caps. The constituents of the brazing mixture are readily available in powdered form from a variety of suppliers such as Alpha Inorganics of Beverly, Massachusetts.

By way of specific illustration, a brazing alloy comprising 30 percent by weight titanium and 35 percent by weight each of nickel and niobium, heated from 10 seconds to two minutes at 1,200° Centigrade in an inert gas atmosphere wets high purity aluminum oxide exceptionally well and provides a highly efficient brazed bond between an aluminum oxide arc lamp envelope and its niobium 1 percent zirconium end caps. A consistent helium leak-tight seal is provided which is substantially inert with respect to hot alkali metal vapors such as cesium and rubidium and which may readily be opened by reheating to 1,200° Centigrade and reassembled without degradation of the seal integrity.

For convenience in the manufacture of arc lamps it is desirable to suspend the powdered constituents of the brazing alloy in a binding agent such that the mixture may be painted on the components to be joined prior to heating. A powdered isobutylmethacrylate binder such as ELVACITE–2045 available from the E. I. DuPont de Nemours Co. of Wilmington, Delaware may be dissolved at a weight ratio of 1:5 in xylene. This solution is mixed with the brazing mixture to provide a suspension to be painted on the components. The binder solution vaporizes at 200°–300° Centigrade leaving substantially no residue in the completed braze bond. Although this method is preferred in the production of braze bonds a metal component may alternatively be dip coated with the molten alloy and later joined by reheating to a ceramic component. A further alternative approach to effecting a brazed seal where an alumina arc lamp envelope is to be butt-sealed to the end cap involves the disposition of a pre-alloyed washer of the brazing composition between the end cap and envelope and heating the entire assembly to provide the brazed seal. It is also possible to use individual washers of each of the three brazing composition constituents in the proper weight combinations between the envelope and end cap and to then heat this assembly to alloy the composition and effect the brazed seal.

It has also been discovered by the applicant that, in addition to the exceptional brazed bond provided by the composition described above, a highly efficient oxidation preventative coating may be provided for arc lamp end caps. As an illustrative example, a 2.0 mil thick coating of a 30:35:35 percent by weight alloy of titanium:nickel:niobium respectively has provided substantially complete protection from oxidation of niobium 1 percent zirconium end caps at 1,000° Centigrade in air for operating periods in excess of fifteen hours. Since unprotected caps of 0.030 inch thickness have been found to oxidize completely after 15 minutes at 1,000° Centigrade in air, this feature of the present invention provides a significantly increased lifetime for arc lamps. Also when considered in conjunction with the ease of assembly and disassembly provided by the braze composition of the present invention it will be appreciated that arc lamp electrode replacement becomes feasible with a significant reduction in the expense of using such lamps. Again, for the sake of convenience the composition may be suspended in a binder and painted on the end caps prior to heating, although dip-coating with the molten alloy is also permissible.

It will thus be seen that the applicant has provided a new and novel composition of matter of great utility as a brazing alloy and oxidation resistant coating. Since certain changes in the composition described above will occur to those skilled in the art without departure from the scope of the invention it is intended that all matter contained herein shall be interpreted as illustrative and not in a limiting sense.

Having described what is new and novel and desired to secure by Letters Patent what is claimed is:

1. A brazing alloy having substantial resistance to oxidation at elevated temperatures in air, which wets ceramic surfaces, and which is substantially inert to alkali metal vapors at elevated temperatures said alloy comprising
   22.8 to 36.4 percent by weight titanium
   26.9 to 42.9 percent by weight nickel, and
   20.7 to 50.3 percent by weight niobium.
2. An alloy as recited in claim 1 comprising
   30 percent by weight titanium
   35 percent by weight nickel, and
   35 percent by weight niobium.
3. The method of preparing a brazing alloy having substantial resistance to oxidation at elevated temperatures in air, which wets ceramic surfaces and which is substantially inert to alkali metal vapors at elevated temperatures, said method comprising the steps of
   preparing a mixture of 22.8 to 36.4 percent by weight titanium, 26.9 to 42.9 percent by weight nickel and 20.7 to 50.3 percent by weight niobium,
   heating said mixture in a preselected environment to a temperature greater than 1,190° Centigrade and less than 1,220° Centigrade,
   maintaining said mixture at said temperature for less than 2 minutes, and
   cooling said mixture to ambient temperature.
4. The method recited in claim 3 wherein
   said mixture is prepared in the proportion of 30 percent by weight titanium, 35 percent by weight nickel, and 35 percent by weight niobium.
5. The method recited in claim 3 wherein
   said preselected environment is a vacuum.
6. The method recited in claim 3 wherein
   said preselected environment is an inert gas.
7. The method recited in claim 3 wherein
   said temperature is 1,200° Centigrade.
8. The method recited in claim 3 further including
   the step of suspending said mixture in a preselected quantity of a binding agent.
9. The method in claim 8 wherein
   said binding agent comprises a xylene solution of isobutyl-methacrylate.
10. The method of effecting a braze bond between a metal component and a ceramic component comprising the steps of
    coating the surfaces of said metal and ceramic components with a brazing composition formed of 22.8 to 36.4 percent by weight titanium, 26.9 to 42.9 percent by weight nickel, and 20.7 to 50.3 percent by weight niobium,
    heating said ceramic component to a temperature comparable to the temperature of said coated metal component,
    placing said ceramic component proximate said coated metal component to form an intermediate assembly,
    heating said intermediate assembly to flow said brazing composition between said metal component and said ceramic component and to wet said ceramic component with said brazing composition, and
    cooling said assembly to solidify said brazing composition and thereby effect said bond.
11. The method recited in claim 10 further including
    the step of suspending said brazing composition in a preselected quantity of a binding agent prior to coating said components.
12. The method recited in claim 11 wherein
    said binding agent comprises a xylene solution of isobutyl-methacrylate.
13. The method recited in claim 10 wherein
    said brazing composition comprises 30 percent by weight titanium, 35 percent by weight nickel, and 35 percent by weight niobium.
14. The method recited in claim 10 wherein
    said ceramic component is an aluminum oxide arc lamp envelope, and
    said metal component is a niobium 1 percent zirconium arc lamp end cap.
15. The method recited in claim 14 wherein
    all exterior surfaces of said niobium 1 percent zirconium end cap are coated with said brazing composition.
16. The method recited in claim 15 wherein
    said end cap surfaces are coated with said brazing composition to a thickness of at least 2.0 mils.

* * * * *